US011648799B2

(12) United States Patent
Parry-Williams et al.

(10) Patent No.: US 11,648,799 B2
(45) Date of Patent: May 16, 2023

(54) WHEEL COVER

(71) Applicant: McLaren Automotive Limited, Surrey (GB)

(72) Inventors: Dan Parry-Williams, Woking (GB); William Cann, Woking (GB); Sam Purvis, Woking (GB)

(73) Assignee: McLaren Automotive Limited, Surrey (GB)

( * ) Notice: Subject to any disclaimer, the term of this patent is extended or adjusted under 35 U.S.C. 154(b) by 189 days.

(21) Appl. No.: 16/593,545

(22) Filed: Oct. 4, 2019

(65) Prior Publication Data

US 2020/0114681 A1  Apr. 16, 2020

(30) Foreign Application Priority Data

Oct. 11, 2018 (GB) ..................................... 1816602

(51) Int. Cl.
| | | |
|---|---|---|
| *B60B 7/06* | (2006.01) | |
| *B60B 7/02* | (2006.01) | |
| *B60B 7/20* | (2006.01) | |
| *B60B 27/00* | (2006.01) | |
| *B60B 27/02* | (2006.01) | |

(52) U.S. Cl.
CPC ................ *B60B 7/066* (2013.01); *B60B 7/02* (2013.01); *B60B 7/20* (2013.01); *B60B 27/0063* (2013.01); *B60B 27/02* (2013.01); *B60B 2900/1216* (2013.01); *B60B 2900/513* (2013.01)

(58) Field of Classification Search
CPC ......... B60B 7/066; B60B 7/02; B60B 7/0063; B60B 2900/1216; B60B 2900/513
See application file for complete search history.

(56) References Cited

U.S. PATENT DOCUMENTS

| | | | | |
|---|---|---|---|---|
| 6,120,104 A | * | 9/2000 | Okamoto | .............. G09F 21/045 |
| | | | | 40/587 |
| 6,536,848 B1 | * | 3/2003 | Goodman | ................. B60B 7/20 |
| | | | | 40/587 |
| 6,554,370 B2 | * | 4/2003 | Fowlkes | ................. G09F 19/12 |
| | | | | 301/37.108 |

(Continued)

FOREIGN PATENT DOCUMENTS

| | | |
|---|---|---|
| CN | 2663176 Y | 12/2004 |
| DE | 3231364 A1 | 3/1984 |
| FR | 3044591 A1 | 6/2017 |

OTHER PUBLICATIONS

UK search report for corresponding GB Appl No. 1816602.5, dated Feb. 6, 2019.

(Continued)

*Primary Examiner* — Scott A Browne
(74) *Attorney, Agent, or Firm* — Fish & Richardson P.C.

(57) ABSTRACT

A vehicle wheel structure comprising: a road wheel; a wheel mounting whereby the wheel is mounted to the body of the vehicle, the mounting structure comprising a wheel bearing by which the wheel can revolve about a wheel axis with respect to the body of the vehicle; a wheel cover attached to the wheel by a wheel cover bearing by which the wheel can revolve about the wheel axis with respect to the wheel cover; and a link coupled between (i) the cover and (ii) one of the mounting structure and the vehicle body for resisting rotation of the wheel cover with respect to the wheel mounting about the wheel axis.

17 Claims, 9 Drawing Sheets

(56) References Cited

U.S. PATENT DOCUMENTS

| | | | | |
|---|---|---|---|---|
| 6,896,334 B1* | 5/2005 | Baker | ............... | B60B 7/20 |
| | | | | 301/37.38 |
| 7,014,273 B1* | 3/2006 | Yang | ............... | B60B 7/20 |
| | | | | 301/37.109 |
| 7,503,630 B2* | 3/2009 | Chester, Jr. | ............... | B60B 7/20 |
| | | | | 301/37.109 |
| 7,775,540 B2* | 8/2010 | Young | ............... | B60B 7/14 |
| | | | | 280/288.4 |
| 7,988,239 B1* | 8/2011 | Baker | ............... | B60B 7/04 |
| | | | | 301/37.371 |
| 9,153,924 B1* | 10/2015 | Byers | ............... | B60B 7/20 |
| 11,220,132 B2* | 1/2022 | Butler | ............... | B60B 7/06 |
| 2005/0146204 A1* | 7/2005 | Kim | ............... | B60B 7/006 |
| | | | | 301/37.25 |
| 2011/0080019 A1 | 4/2011 | Castillo | | |
| 2013/0096781 A1 | 4/2013 | Reichenbach et al. | | |

OTHER PUBLICATIONS

Machine Translation of German Patent No. DE 3231364A1, published on Mar. 1, 1984, 16 pages.

Electrek.co [online], "Tesla Model 3 aero wheels can increase efficiency by ~10%, says VP of Engineering," Aug. 22, 2017, retrieved on Dec. 19, 2022, retrieved from URL <https://electrek.co/2017/08/22/tesla-model-3-aero-wheels-can-increase-efficiency-vp-engineering/>, 6 pages.

* cited by examiner

WHEEL COVER

CROSS REFERENCE TO RELATED APPLICATIONS

The present application claims priority to United Kingdom Application No. 1816602.5, filed on Oct. 11, 2018, the disclosure of which is incorporated herein by reference.

TECHNICAL FIELD

This invention relates to wheel covers.

BACKGROUND

The design of a vehicle's wheel has a number of effects on the performance of the vehicle. For example, it may affect the escape of heat from the vehicle's brakes, it may affect the drag of the vehicle and it may lead to unwanted lift if it traps air and permits that air to spin in the confines of the wheel.

Regarding drag, when a vehicle is in motion it is generally desirable for air flowing along the side of the vehicle to remain attached to the vehicle. That typically reduces the vehicle's drag. One factor that can induce air to separate from the vehicle is that the air may be disturbed when it meets the structure of a rotating wheel: for example the wheel's spokes.

It is known to provide a vehicle wheel with a hubcap which covers the wheel's spokes and rotates with the wheel. Frequently these are provided for primarily aesthetic purposes, but they can be smoothed to help reduce drag. It is also known to provide a vehicle wheel with spinning hub caps. These are free to rotate with respect to the wheel and to the body of the vehicle and are believed by some to improve the aesthetics of the vehicle.

It would be desirable to improve the aerodynamic properties of a vehicle wheel.

SUMMARY

According to one aspect there is provided a vehicle wheel structure comprising: a road wheel; a wheel mounting whereby the wheel is mounted to the body of the vehicle, the mounting structure comprising a wheel bearing by which the wheel can revolve about a wheel axis with respect to the body of the vehicle; a wheel cover attached to the wheel by a wheel cover bearing by which the wheel can revolve about the wheel axis with respect to the wheel cover; and a link coupled between (i) the cover and (ii) one of the mounting structure and the vehicle body for resisting rotation of the wheel cover with respect to the wheel mounting about the wheel axis.

The link may be coupled between the cover and the mounting structure. The link may be coupled between the vehicle body and the mounting structure. The link may be rigid.

The wheel bearing may be configured to transfer at least part of the weight of the vehicle body to the wheel.

The structure may comprise a wheel cover mounting comprising: an outer shell attached to the wheel; and an inner element attached to the outer shell by the wheel cover bearing, the wheel cover being fixed to the inner element. The inner element may extend through the outer shell. The outer shell may be removably attached to the wheel. The wheel cover may be attached to the wheel via the wheel cover mounting. The wheel cover mounting may carry the weight of the wheel cover. The outer shell may be attached to the wheel at the centre of the wheel. The axis of the wheel cover bearing may be coincident with the wheel axis.

The link may be configured to engage the inner element for resisting rotation of the inner element with respect to the wheel mounting about the wheel axis. The outboard end of the link may be configured to engage the inboard end of the inner element in a manner that resists relative rotation of the link and the inner element about the wheel axis. One may be a splined fit in the other. The outboard end of the link may be configured to engage the inboard end of the inner element in a manner that permits at least limited relative rotation of the link and the inner element about an axis perpendicular to the wheel axis. The link is configured to engage the inner element (e.g. for rotation-fast interaction between the two about the wheel axis) through relative motion of the link and the inner element parallel to the wheel axis. The link and the inner element may be configured to define a clevis link therebetween.

The outboard surface of the wheel cover may be substantially flat. The maximum deviation parallel to the wheel axis between any parts of the outboard surface of the wheel cover may be less than 10 mm or less than 1 mm.

The majority of the periphery of the wheel cover about the wheel axis may lie on a circle about the wheel axis.

The wheel may comprises a wheel rim. The wheel rim may support a tyre. The distance parallel to the wheel axis between the parts of the periphery of the wheel cover that lie on the said circle and the outboard surface of the rim of the wheel may be between 2 mm and 10 mm.

At least part of the periphery of the wheel cover about the wheel axis (as projected onto a plane perpendicular to the wheel axis) may be inboard of the said circle, defining a hole between the said circle and the said part of the periphery. The wheel cover may define a hole therethrough, the hole being within the periphery of the wheel cover. The hole may be located wholly or at least partially above the wheel axis. The hole may be located wholly or at least partially behind the wheel axis.

The wheel structure may comprise a brake caliper arranged for braking the wheel. The hole may be located adjacent the brake caliper.

The periphery of the wheel cover may extend more than 50% or more than 75% or more then 80% of the wheel's radius from the wheel's axis in a direction perpendicular to that axis. That may assist the aerodynamic properties of the cover.

The wheel rim may be coupled to the wheel bearing by spokes comprised in the wheel. At least part of one or more of the spokes may be covered by the cover from a location outboard of the wheel. The entirety of one or more of the spokes may be covered by the cover from a location outboard of the wheel.

BRIEF DESCRIPTION OF THE FIGURES

The present invention will now be described by way of example with reference to the accompanying drawings. In the drawings.

DETAILED DESCRIPTION

Figure 1:
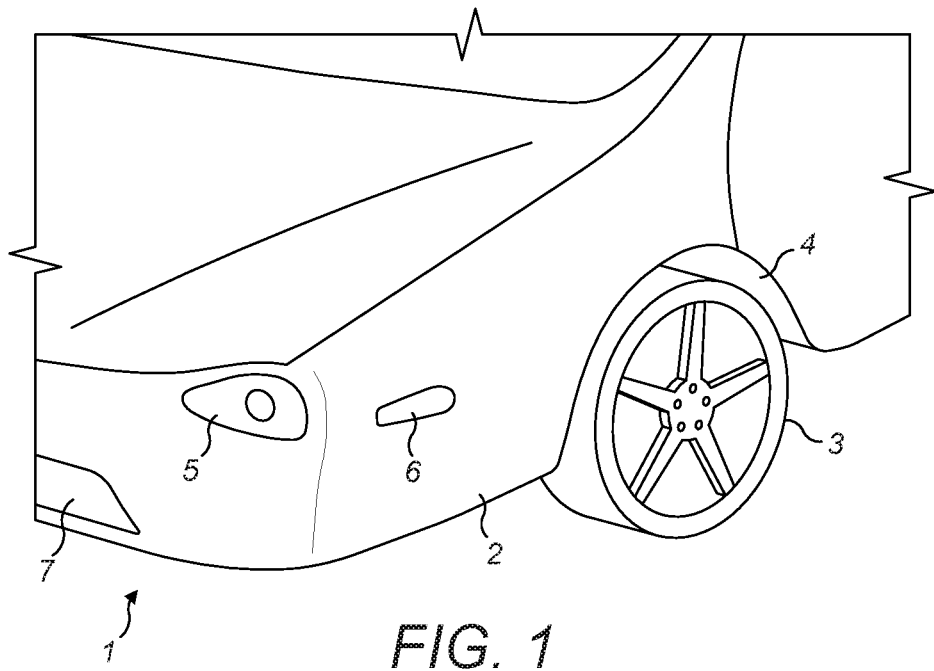
FIG. 1 is a schematic front quarter view of a first road vehicle.
Figure 2:
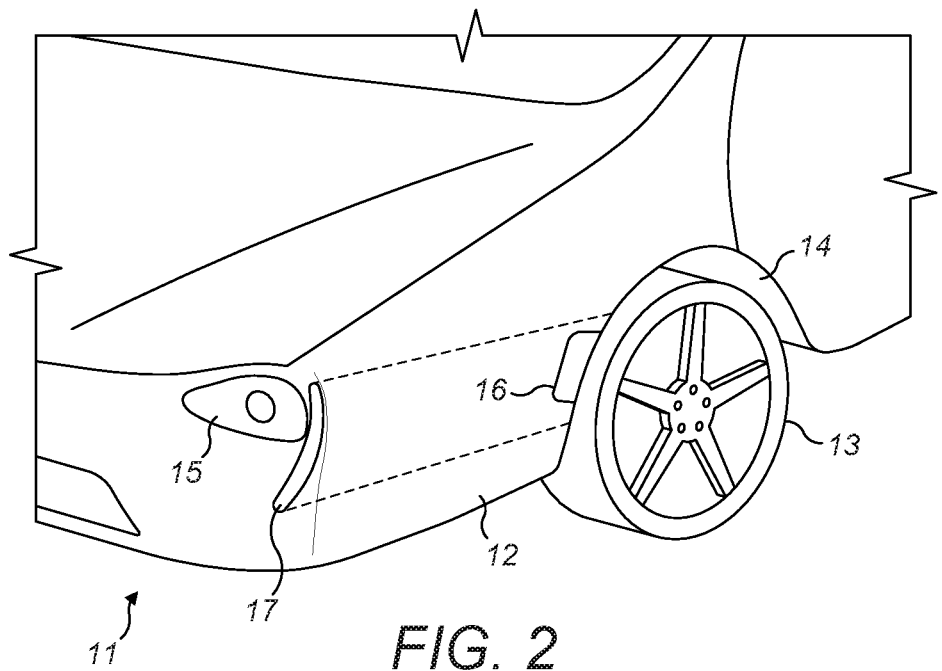
FIG. 2 is a schematic front quarter view of a second road vehicle.

The vehicle of FIGS. 2 to 5 has a forward-facing region shown at 11, and a front wing or wing panel shown at 12. A front road wheel 13 is located in a wheel arch 14 which is defined at least in part by the front wing. This region of the vehicle has two light units. A forward-directed light unit 15 is located in the forward-facing region 11. The forward-directed light unit contains a headlamp and a turn indicator lamp. A side-facing light unit 16 is located in the wing 12. This provides turn indication to the side of the vehicle. In the vehicle of FIG. 2, a duct 17 is defined which runs through the body of the vehicle from a location in the forward-facing region 11 adjacent the forward-facing lamp unit 15 to a location in the interior of the front wheel arch 14. The duct conveys high energy air from the front of the vehicle to the wheel arch 14. The presence of this high energy air in the interior of the wheel arch can help resist the separation of air flow from the side of the vehicle.

In more detail, the vehicle of FIGS. 2 to 5 is an automobile intended for road use. The vehicle has four road wheels, only one of which is shown in the figures. Any of the road wheels may be driveable (e.g. by an internal combustion engine and/or an electric motor) to cause the vehicle to move. The exterior of the body of the vehicle is defined by a set of body panels. Each body panel is a sheet element whose outer surface defines part of the exterior surface of the vehicle. The body panels may conveniently be made of a composite material such as a carbon fibre/resin composite, or of a metal such as aluminium or steel.

FIGS. 2 to 5 show part of the left side of the vehicle. The right side is a mirror image.

Forward-facing region 11 defines the front-most part of the vehicle. The forward-facing region includes a generally upright bumper or fender part 20 and a splitter 21. Between the bumper part 20 and the splitter 21 there are air inlets such as inlet 22. Air meeting the front of the vehicle can pass through these inlets and then through one or more radiators or heat exchangers to cool operational parts of the vehicle. Because of the air resistance presented by the heat exchangers, once this air has passed through a heat exchanger it has relatively little kinetic energy relative to the vehicle. Forward-facing region 11 also includes forward-directed light units such as light unit 15. One of these units is located on either side of the car. Each of these units includes at least one headlamp for illuminating the road in front of the vehicle. Each unit may also include a forward-directed turn indicator and/or a daytime running lamp.

Lamp unit 16 is located on the front wing 12. It is directed to the side of the vehicle. It may serve as a side repeater turn indicator or a continuously illuminated side marker lamp.

The wing 12 is defined by a wing body panel. The wing body panel defines the exterior surface of the upper flank or side edge 23 of the forward part of the vehicle. The wing body panel also defines the exterior surface of the vehicle below that edge, as indicated at 24. The wing body panel may also define the upper surface of the forward part of the vehicle, as indicated at 25. The wing of the vehicle extends in a longitudinal direction from the forward-facing region 11 to at least the forward edge of the front wheel arch 14, and may extend to the forward edge of the forward-most occupant door on the relevant side of the vehicle. The wing extends in a vertical direction from the lowest part of the side of the vehicle within the longitudinal extent of the wing to the flank of the vehicle within that longitudinal extent. The wing is defined by one or more wing body panels. Such panels may extend to other regions of the vehicle: for example they may define part of the forward-facing region or part of the upper surface of the front of the vehicle.

Figure 3:
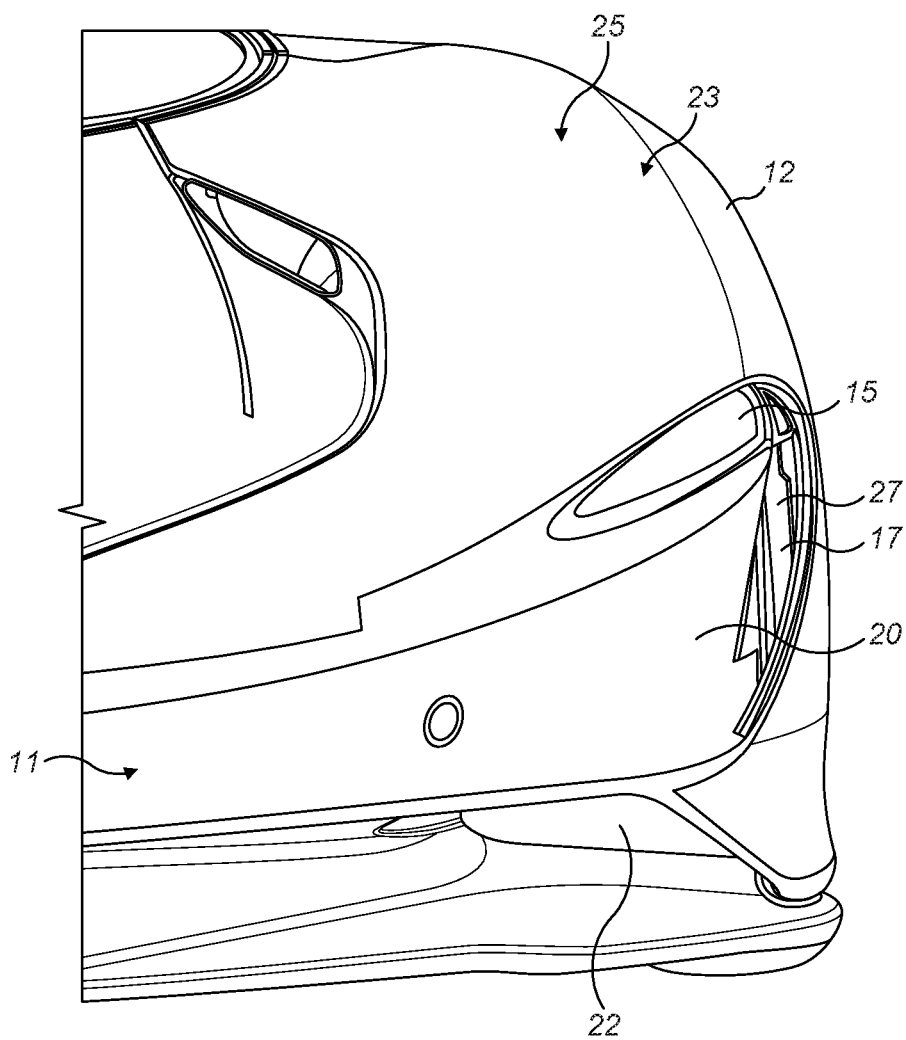
FIG. 3 is a more detailed front view of the left part of the second road vehicle from the front.
Figure 4:
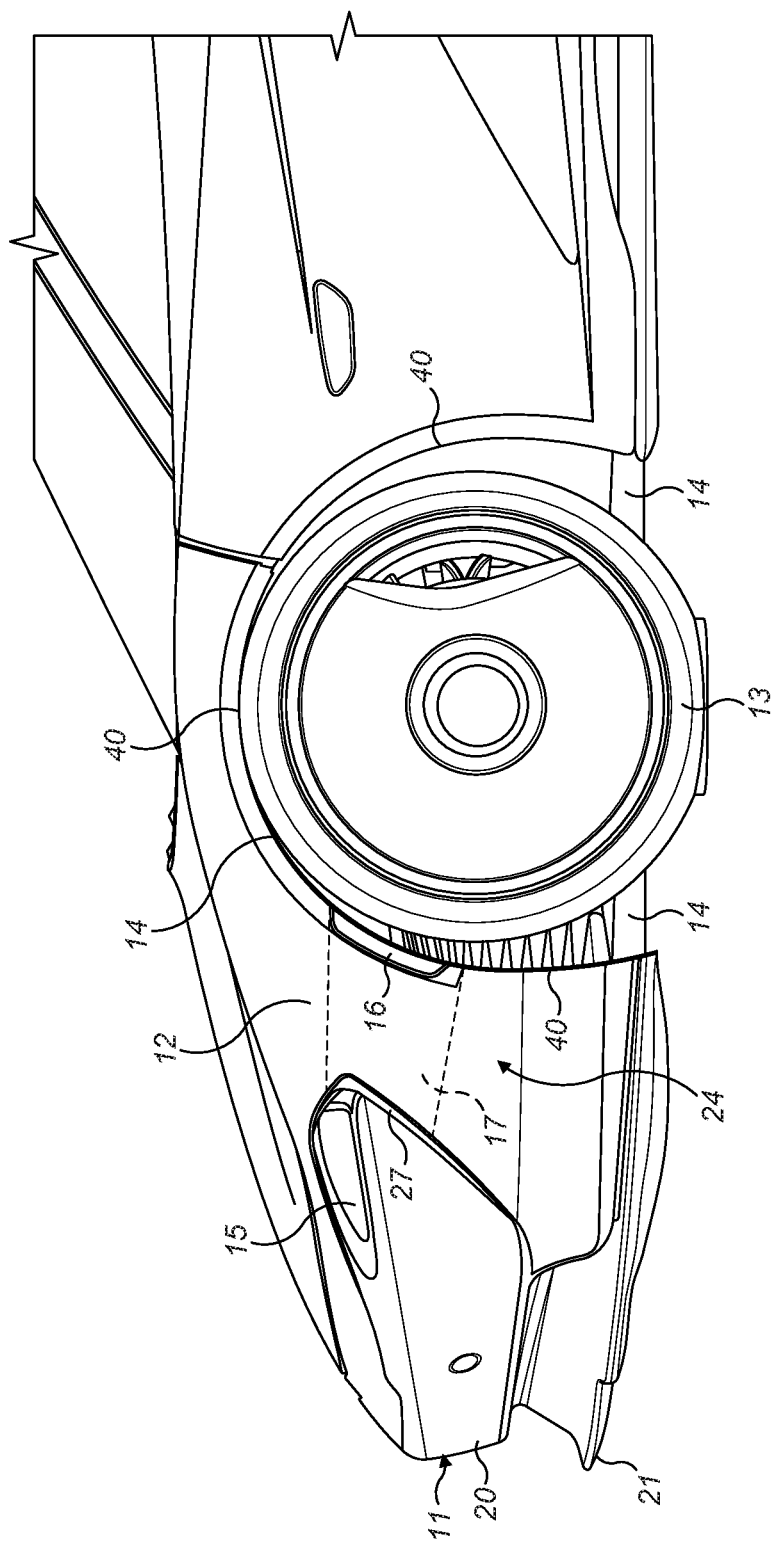
FIG. 4 is a view of the front part of the second road vehicle from the left side.
Figure 5:
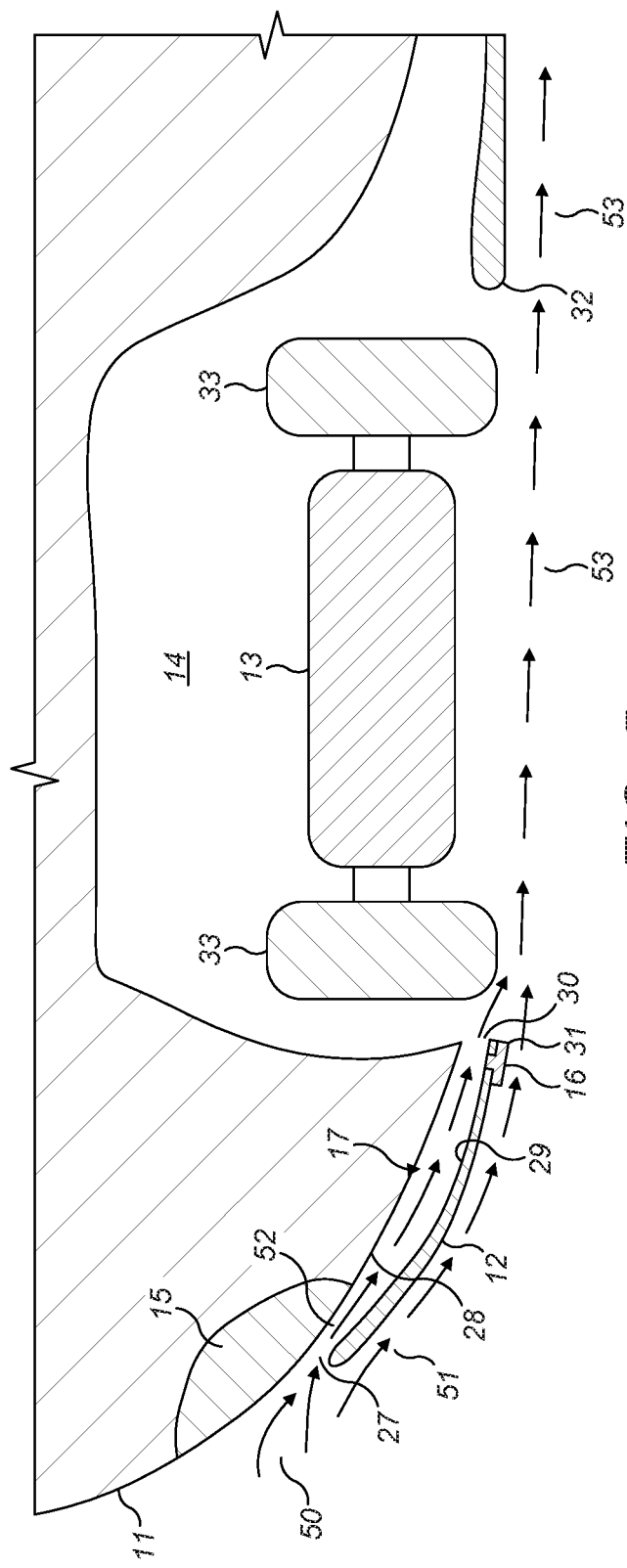
FIG. 5 is a horizontal cross-section of part of the second road vehicle.

As is shown in FIG. 3, the wing body panel is spaced outwardly from the panel defining the bumper 20. This defines a gap 27 between the front region 11 of the vehicle and the panel(s) defining the side of the vehicle. That gap is open to the front of the vehicle. It forms the entrance 27 to the duct 17. The entrance may be located so that it is exposed directly to the front of the vehicle. At least part of the entrance may be located such that no part of the vehicle lies forward of it on a line parallel with the vehicle's X axis and running through that part. The mean plane of the entrance 27 may be directed such that a line perpendicular to that plane make an angle of less than 45° to the vehicle's X axis. As shown in FIG. 5, the remainder of the length of the duct 17 is defined between (i) a rearward continuation of the bumper structure (this defines the majority of the inboard surface of the duct) and (ii) the wing body panel (this defines the majority of the outboard surface of the duct). The inboard surface of the body of the duct is defined by an outboard-facing surface 28 of a panel which is elongate in at least the vehicle's X direction. The outboard surface of the body of the duct is defined by an inboard-facing surface 29 of the wing panel. The upper and lower surfaces of the duct may be defined in any convenient way, but they may, for example be defined by the wing panel. The interior surfaces of the duct are preferably smooth and/or gradually curved, so as to limit any reduction of the kinetic energy (relative to the vehicle) of air passing through the duct. The duct is unobstructed by any radiator or heat exchanger. The duct has an exit 30. The exit 30 opens into the wheel arch of the vehicle. The exit is located wholly or predominantly inboard of the outer lip 40 (see FIG. 4) of the wheel arch. The exit communicates directly with the volume within the wheel arch. The exit may be wholly inboard of the wing of the vehicle on the same side. The wheel arch is bounded at its forward lateral edge by the rear edge of the wing panel (see 31 in FIG. 5) or by a structure carried by the wing panel, such as lamp 16. The wheel arch is bounded at its rear lateral edge by another body panel 32, which may conveniently form part of an occupant door of the vehicle. It is preferred that all parts of the exit 30 of the duct lie within the bounds of the wheel arch. It is preferred that the exit 30 of the duct is located so that, in at least one condition of the vehicle, when the vehicle is in motion at a speed greater than 100 km/h or greater than 150 km/h or greater than 200 km/h in a straight line in still air at standard temperature and pressure (these will be referred to below as "reference conditions") air exiting the duct will predominantly flow into the wheel arch.

FIG. 5 shows air flow through and around the duct 17. In FIG. 5 a tyre and a rim of the wheel 13 of the vehicle are shown at 33. Air meeting the front 11 of the vehicle is pushed outwards, as shown generally at 50. Some of that air passes around the exterior of the wing 12, as shown at 51. Some of the air meeting the front of the vehicle enters duct 17, as shown at 52. When the air passing around the exterior of the wing meets the wheel arch 14 (i.e. immediately rearward from 31) there is potential for that air to detach from the vehicle. That detachment would reduce the vehicle's aerodynamic efficiency. In the arrangement shown in FIG. 5, the high energy air exiting duct 17 into the wheel arch is constrained in direction by the design of the duct 17. The duct 17 forces that air to be directed with a vector that is predominantly or more preferably strongly in the vehicle's X direction (e.g. such that in reference conditions the mean vector of that air as it exits the duct is offset from the vehicle's X axis by less than 20°), towards the rear of the vehicle. That rearward flow of air meets the flow of air that has passed over the exterior of the wing, and tends to energise the flow of air that has passed over the exterior of the wing. This induces the flow of air that has passed over the exterior of the wing to remain attached to the vehicle, as indicated at 53. This can narrow the vehicle's wake and reduce the vehicle's drag.

It is preferred that the exit of 30 of the duct is located in the wheel arch and close to the outboard edge of the wheel arch. This can help flow from the duct to meet the flow along the exterior of the wing. For example, in at least one X-Y plane of the vehicle, the offset in the vehicle's Y direction between the outboard edge of the duct's rear opening 30 and the forward outboard rim of the wheel arch may be less than 5 mm, 10 mm, 20 mm or 50 mm. That relationship may apply over more than 30% or more than 60% of the height (in the vehicle's Z direction) of the duct's rear opening. The width of the duct in the vehicle's Y direction may, for example, be between 50 mm and 100 mm over at least 60% of the length (in the vehicle's X direction) of the duct. The height of the duct may, for example, be between 15 mm and 30 mm over at least 60% of the length of the duct. In the vehicle's X-Z plane the height of the duct may be at least 3 times or at least 5 times the width of the duct over at least 60% of the length of the duct. Ducts of these dimensions may provide an effective high energy flow of air to the interior of the wheel arch without greatly affecting the frontal area of the vehicle. The rim of the wheel arch may be a locus around which a plane tangent to the outer surface of the wheel arch makes an angle of 45° to the wheel axis.

FIG. 5 shows that the rear of the light module 16 defines part of the interior surface of the duct 17. The rear of the light module is exposed to air in the duct. This allows the light module to be cooled by air in the duct.

The wing panel that defines the lateral surface of the duct 17 may terminate at its rearward end at the forward rim of the wheel arch into which the duct opens. The wing panel that defines the lateral surface of the duct 17 may define at least part of the upper surface of the front of the vehicle, as shown at 25 in FIG. 3. The vehicle's panels may be defined in any convenient manner. For example, in the description above the wing has been described as being defined by a wing panel. The wing panel could be composed of multiple separate elements. The wing of the vehicle may be defined by multiple panels. A different panel may define the lateral surface of the duct from any which defines the exterior surface of the vehicle.

FIGS. 6 to 9 show aspects of a wheel structure. This wheel structure can itself provide advantages by itself, but it has been found to be particularly advantageous in conjunction with the duct described above.

Figure 6:
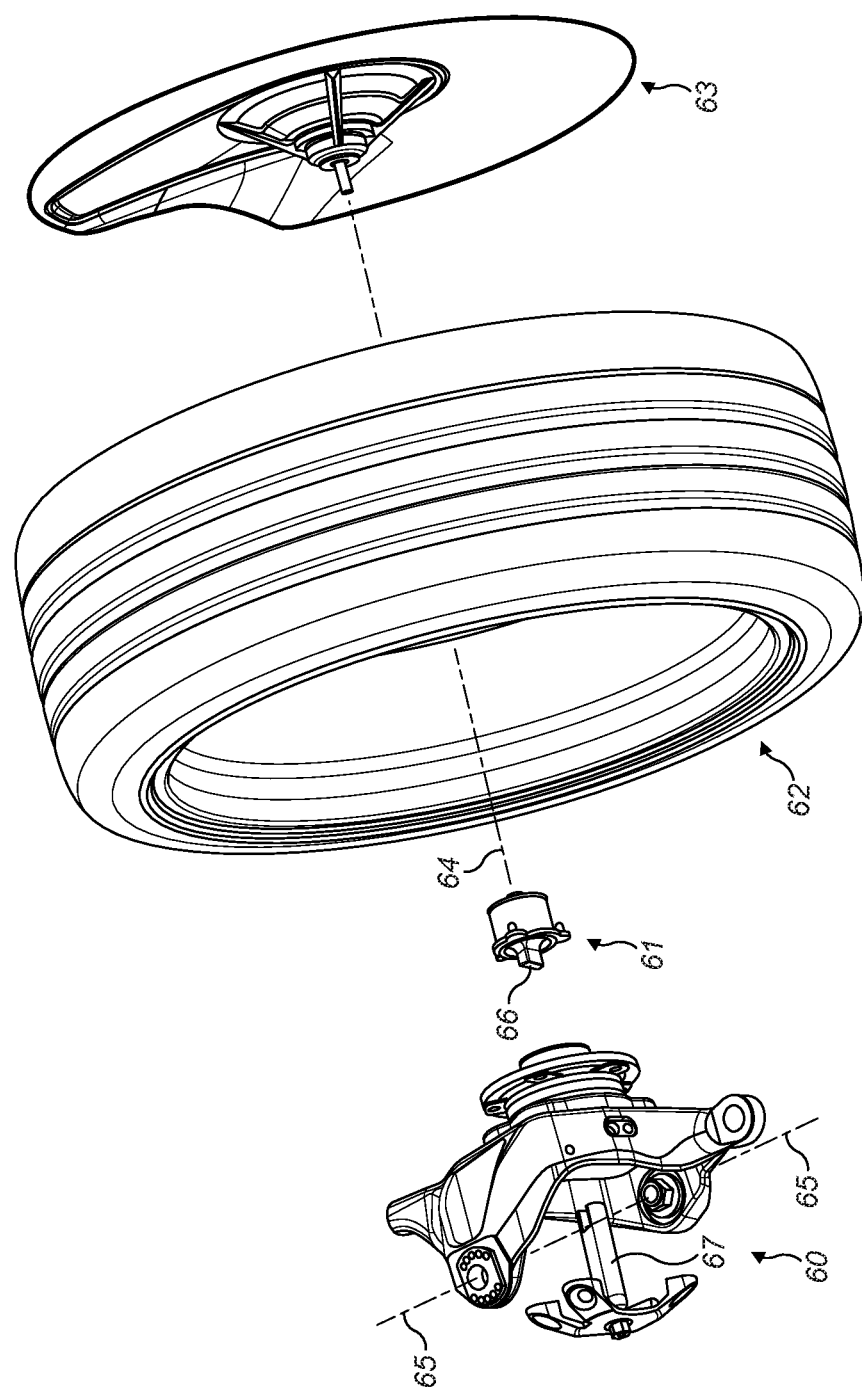
FIG. 6 is an exploded view of a wheel and associated components.

The wheel structure is shown generally in FIG. 6. The wheel structure comprises a mounting arrangement 60, a hub cartridge 61, a road wheel 62 and a wheel cover 63. The mounting arrangement mounts the wheel to a vehicle. It can permit rotation of the wheel relative to the vehicle about the wheel's central axis 64 and about a steering axis 65. In practice the steering axis is roughly vertical (e.g. within 20° of the vehicle's Z axis when the structure is attached to a vehicle). As will be described in more detail below, the hub cartridge is attached to the centre of the wheel. The hub cartridge has a core 66 which is free to rotate relative to the wheel about the wheel axis 64. The wheel cover 63 is attached to the core 66. A rigid reaction link 67 extends from the body of the mounting arrangement to the core 66. The reaction link engages the core and prevents it rotating as the wheel spins. In that way the wheel cover is prevented from spinning with the wheel.

The wheel structure will now be described in more detail.

Figure 7:
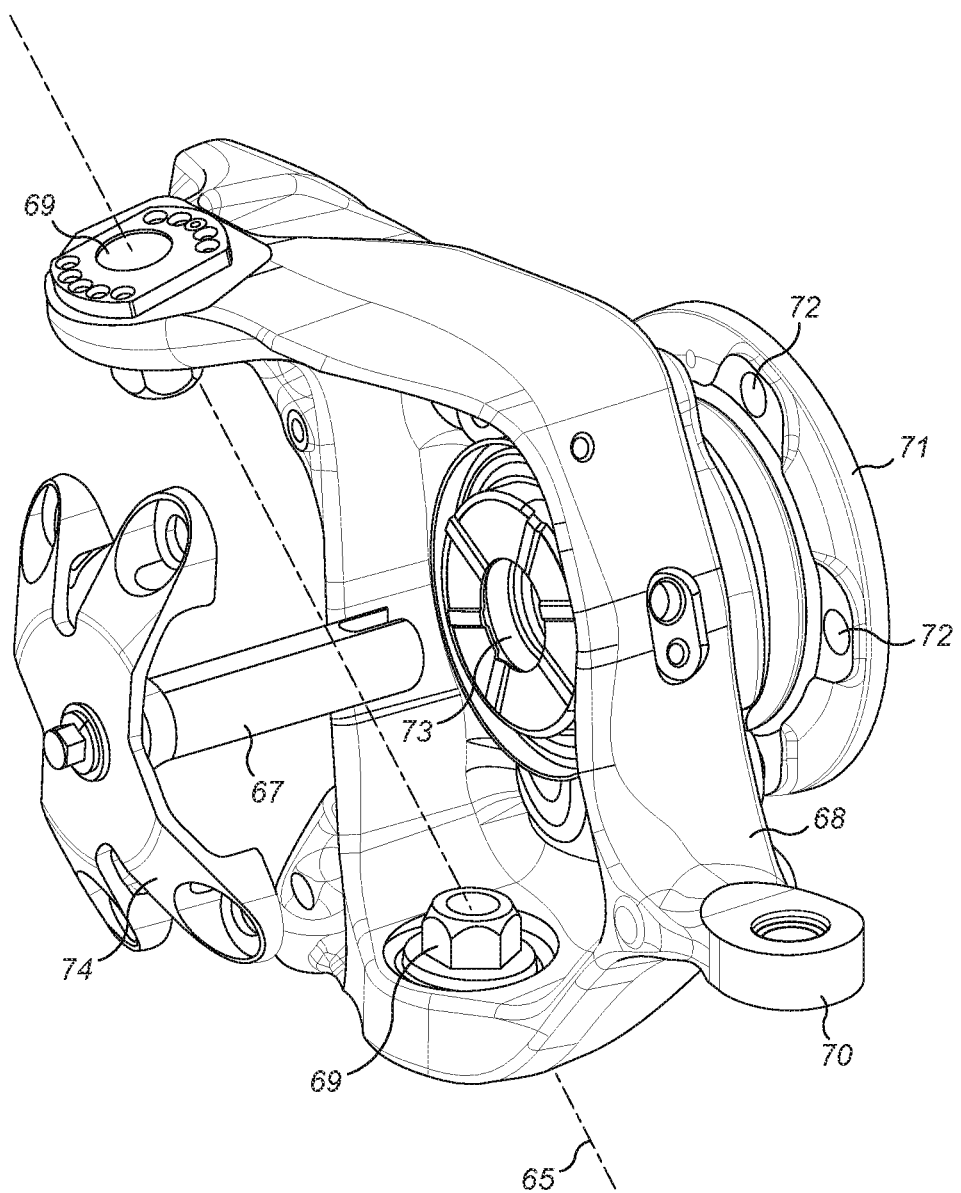
FIG. 7 is an exploded view of a wheel mounting structure.

FIG. 7 shows the mounting arrangement. The mounting arrangement comprises a body 68. The body is a rigid component which attaches by mounts 69 to a vehicle's body. Mounts 69 are arranged to permit rotation of the mounting body 68 relative to the vehicle's body about the steering axis 65. The steering axis runs through the mounts 69. The mounting body has an attachment point 70 for a steering arm which can cause the body to rotate about the steering axis. A wheel bearing is located between the mounting body and a wheel carrier 71. The wheel bearing permits the wheel carrier to rotate freely about its axis relative to the mounting body. The wheel carrier has a series of holes 72 for receiving wheel bolts whereby the wheel 62 can be attached to the wheel carrier. The wheel carrier could alternatively have a series of threaded studs onto which the wheel can be tightened by means of wheel nuts. Once the mounting body is attached to the body of a vehicle and the wheel is attached to the wheel carrier, the wheel is attached to the vehicle such that it can (i) spin relative to the mounting body about its own axis 64 by virtue of the wheel bearing and (ii) rotate with the mounting body and relative to the body of the vehicle about the steering axis 65.

The wheel carrier 71 rotates with the wheel. The wheel carrier has a hole extending through its centre. The wheel bearing has a hole extending through its centre. The mounting body 68 has a through-hole 73 aligned with the through-holes in the wheel carrier and the wheel bearing. As a result, when the wheel is mounted on the wheel carrier, the centre region of the wheel is accessible along the wheel's axis 64 from the inboard side of the mounting body 68. (That is the side from which it is viewed in FIG. 7).

The mounting arrangement comprises the reaction link 67. The reaction link is a rod which is sized to pass through the hole 73 in the mounting body and the corresponding holes in the wheel bearing and the wheel carrier. At its inboard end the reaction link is rigidly attached to a spider 74. The spider is a rigid component which extends radially outward from the reaction link. The reaction link is rigidly attached to the mounting body by the spider. It will be appreciated that the reaction link could be attached to the mounting body by any suitable structure: for example it could have a splined fit to the hole 73.

Figure 8:
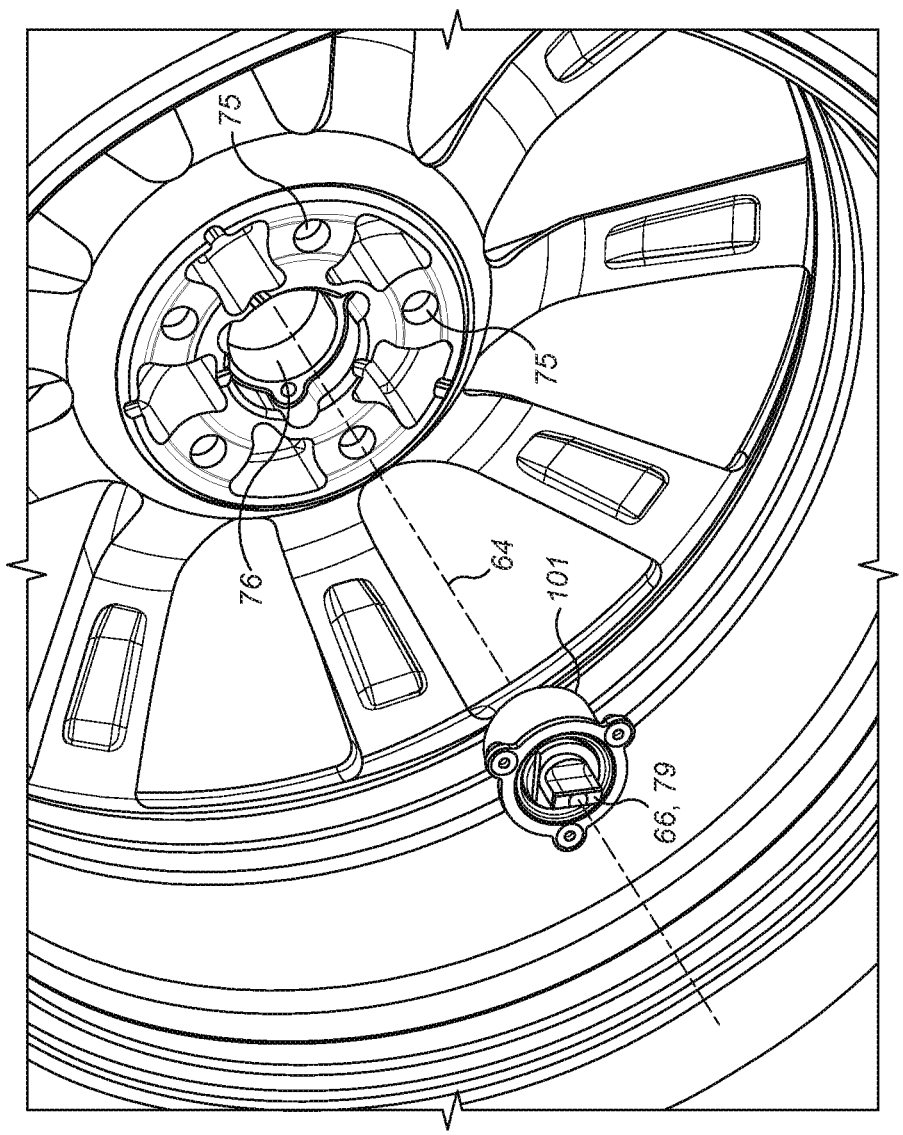
FIG. 8 is an exploded view of a wheel and a hub cartridge.
Figure 9:
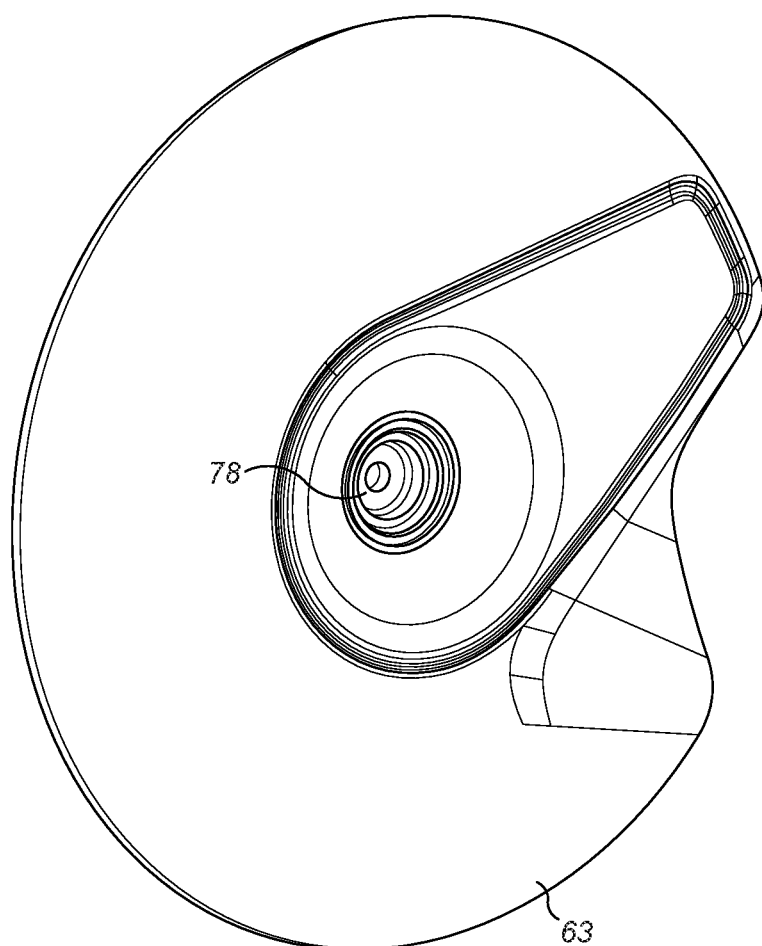
FIG. 9 shows a wheel cover.

Turning to FIG. 8, the wheel has a series of holes 75 whereby it can be attached to the wheel carrier. Other forms of wheel mounting could be used. The centre of the wheel has a through-hole 76. The hub cartridge 61 has an outer sleeve 101 and an inner shaft or core 66. The inner shaft is mounted to the outer shell by bearings so that the inner shaft is capable of revolute motion with respect to the outer shell. Preferably these are roller bearings, or two spaced-apart races of ball bearings, so as to resist tilting of the inner shaft perpendicular to the wheel rotation axis. This can help to reduce play of the cover relative to the wheel rim when the cover is attached to the inner shaft as will be discussed below. The outer shell is shown separated from the wheel in FIG. 8 but in use the outer shell is rigidly attached to the wheel with the inner shaft 66 through the through-hole 76 and the rotation axis of the inner shaft aligned with the rotation axis of the wheel. The inner shaft 66 could be linked by a bearing directly to the body of the wheel, the body of the wheel being integral with the wheel spokes and optionally the wheel rim. However, it is advantageous if the hub cartridge has the sleeve 101 containing the bearing and if that sleeve is removable from the wheel, preferably by means of hand tools. This can assist with tyre fitment and wheel balancing. It may be advantageous for the outer surface of the sleeve 101 to be a taper fit in the hole in which it fits in the centre of the wheel. This can be achieved if one or both of the interior of that hole and the exterior of the sleeve is/are tapered so that the two come into contact as the sleeve is brought home in the hole. This permits the sleeve to be self-centering with respect to the wheel when the two are assembled together.

The wheel cover 63 has generally the form of a plate. At the centre of the wheel cover is a fixing 78. The fixing is arranged so it can attach the cover rigidly to the inner shaft 66. For example, the fixing may comprise a bolt which can be screwed into a threaded hole in the outboard end of the inner shaft. The fixing can attach the cover to the shaft in such a way that the cover is rotationally fast with the shaft about the wheel axis 64. This may be achieved by there being positive engagement between the shaft and the fixing (e.g. a spline) and/or by the fixing being tightened to the shaft (e.g. by a threaded fastener). The wheel cover is conveniently rigid, so that it does not flex when the vehicle is under way.

The inner shaft 66 is configured on its inboard end so it can mate with the outboard end of the reaction link 67 in such a way that the reaction link is rotationally fast with the inner shaft about the rotation axis 64 of the wheel. The inner shaft is also configured so that that mating can be achieved by bringing the inner shaft and the reaction link together in a direction along the rotation axis 64 of the wheel. In the example shown in the figures, these properties are achieved by providing the reaction link with a slot 102 which runs radially in its outboard end, and providing the inner shaft 66 with a rib 79 which runs radially in its inboard end. When the hub cartridge is attached to the wheel and the wheel is attached to the wheel carrier, the rib 79 is located in the slot 102. The sides of the rib bear on the sides of the slot, preventing relative rotation of the inner shaft 66 and the reaction link about the wheel axis. Thus the rib and slot define a clevis joint. The rib and the slot could be reversed, so that the rib is on the reaction link and the slot is on the inner shaft 66. Other structures could be used to provide a similar effect: for example one of (i) the inboard end of the inner shaft and (ii) the outboard end of the reaction link could be a splined fit in the other. An advantage of the clevis joint as shown in the figures is that it can permit some angular rotation of the inner shaft relative to the reaction link about axes perpendicular to the wheel axis. Rotation of that nature might take place due to compliance in the wheel bearing when the wheel is under high bump, rebound, acceleration or deceleration load. This play between the inner shaft and the reaction link reduces the extent to which that rotation is transmitted to the reaction link.

To assemble the wheel structure, the mounting structure 60 is attached to the body of the vehicle. The hub cartridge is attached to the wheel. Then the wheel can be attached to the wheel carrier. Because the inner shaft 66 of the hub cartridge can mate with the reaction link though motion along the wheel axis, the inner shaft and the reaction link can be mated through the action of offering the wheel up to the wheel carrier. (The inner shaft 66 might first have to be rotated to a position where it will interlock with the reaction link). Then the wheel can be bolted or otherwise attached to the wheel carrier. The wheel cover can then be fixed to the inner shaft 66.

Once the wheel structure is assembled, the wheel is free to rotate about its axis with respect to the vehicle, but the wheel cover—despite being mounted outboard of the wheel—is restrained from rotating about the wheel's axis. The wheel cover is restrained about that axis because it is fixed to the inner shaft, which in turn is stopped from rotating by the reaction link. On the other hand, the wheel cover will rotate with the wheel when the wheel is moved about its steering axis. It is preferred that the reaction link is sized so that it is spaced from the mounting body, the wheel bearing and the wheel carrier where it passes through them. This reduces the likelihood of the reaction link passing load in vehicle X or Z from the wheel to the mounting structure.

The wheel cover can have a generally smooth exterior surface. When such a wheel cover is in place, it can reduce the drag resulting from the wheels. One reason for this effect may be that airflow past the exterior of the wheel is more likely to remain attached to the exterior of the vehicle. This may reduce the width of the vehicle's wake. This effect can be promoted by the fact that the surface presented to the passing air in the outer centre of the wheel is not rotating. It can also be promoted if the wheel cover sits close to the wheel rim. For example, over at least 50% of the circumference of the wheel rim the spacing between the radially outermost part of the wheel cover and the closest location on the wheel rim may be less than 10 mm or less than 5 mm. It is possible that the wheel cover or its mountings may flex, especially when the vehicle is at high speed. One potential advantage of the mounting system described above is that the cover can be held fixed in a relatively secure manner relative to the wheel rim. In an alternative embodiment the wheel cover could be attached directly to the outboard end of the reaction link, and the hub cassette could be omitted. However, in some applications that may provide less control over the location of the wheel cover than if the hub cassette is used. Conveniently, the periphery of the cover may be located inward with respect to the wheel axis of the innermost part of the tyre that is exposed at the side of the wheel. The tyre may flex during driving, which may otherwise alter the clearance between the cover and the wheel. Conveniently, the majority of the length of the periphery of the cover overlies the rim of the wheel in a projection parallel to the wheel axis. This can help to maintain an accurate clearance between the cover and the wheel.

The configuration of the wheel cover will now be described.

In the description below potential locations for cut-outs or holes in the cover will be described. Where the context permits, these cut-outs or holes may be at the periphery of the cover or within the periphery of the cover When a cut-out or hole is at the periphery of the cover, the periphery of the cover defines part of the periphery of the hole or cut-out, and the remainder of the periphery of the cut-out or hole is defined by the continuation of the curve of the outer rim of the cover from its inflection on one side of the cut-out or hole to its inflection on the other side of the cut-out or hole. That curve may be a circle. Such a circle may have the centre of the cover and/or the wheel axis (when the cover is in place over a wheel) as its centre. When a cut-out or hole is within the periphery of the cover, the periphery of the cut-out or hole does not intersect the periphery of the cover and the cut-out or hole is encircled by material of the cover.

In one example, the wheel cover has a circular rim extending around its entire periphery and a flat or convex dished outer surface. This can assist in reducing drag. In some vehicles, for example moderate-performance vehicles or vehicles whose brakes perform better at high temperatures, this may be optimal. In other vehicles it may be advantageous to provide one or more passages whereby air may readily flow past the wheel cover between the interior of the wheel (i.e. the region bounded by the wheel rim) and the exterior. One advantage of this may be to allow hot air in the interior of the wheel to escape, cooling a brake unit located in the interior of the wheel. Another advantage may be to reduce the lift that may be generated by air spinning in the interior of the wheel. One way to provide such a passage is to configure the cover so that its rim describes only a partial circle. A cut-out may be provided in the remainder of the cover. Thus, the cover may be in the form of a circle having a region missing from its periphery. Alternatively, a through-hole may be provided through a part of the cover such that the hole is surrounded by material of the cover.

Figure 10:
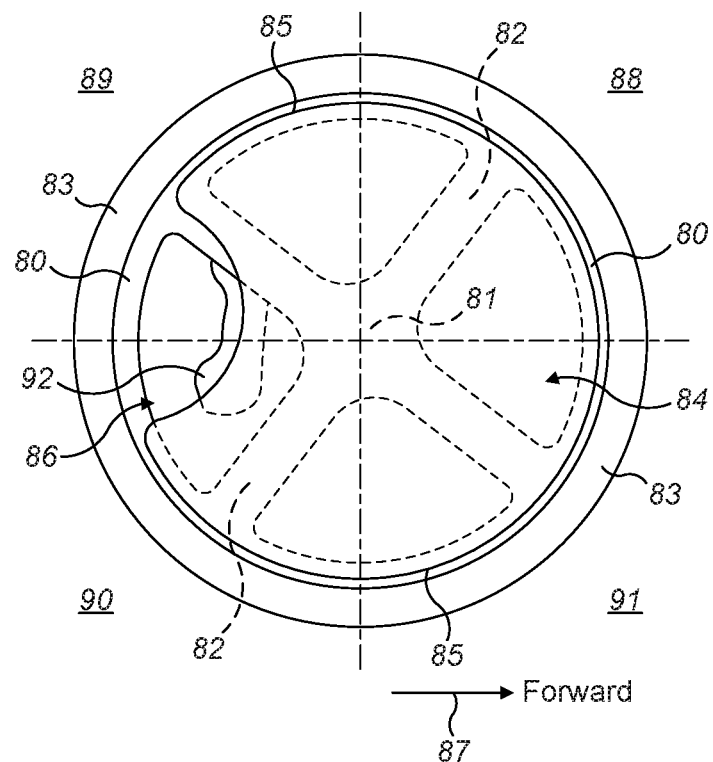
FIG. 10 is a side view of a wheel having a wheel cover.

FIG. 10 shows some potential locations for such a cut-out or hole. In FIG. 10 the wheel comprises a rim 80 attached to a hub 81 by spokes 82. A tyre 83 is located around the rim. A cover 84 is located over the exterior of the wheel. As described above, over the majority of the circumference of the rim the periphery of the cover lies close to the rim. The majority (see 85) of the periphery of the cover lies on a circle about the wheel's rotation axis. Part of the periphery of the cover lies inside that circle. That part of the periphery of the cover defines a cut-out 86. Defining a hole through the cover as a cut-out (i.e. with no part of the cover directly outboard of that hole with respect to the wheel axis) is convenient because it avoids there being relatively narrow outboard parts of the cover which might flex or be easily broken.

In FIG. 10, the forwards direction of travel of the vehicle is shown at 87. Quadrants of the wheel are shown at 88-91. A hole through the cover (e.g. a cut-out as described above) may be located anywhere around the cover. Some preferred factors bearing on the location of the cut-out or hole are:

- It may be advantageous for the cut-out or hole to be wholly or predominantly located in the rear or downstream quadrants 89, 90. Locating a substantial part of the cut-out or hole in the forward or upstream quadrants 88, 91 may increase drag over locating the cut-out or hole substantially in the downstream quadrants. Conveniently greater than 50% or greater than 75% or 100% of the total area of hole(s) though the cover (as projected onto a plane perpendicular to the wheel axis) is located in the downstream quadrants 89, 90.
- It may be advantageous for the cut-out or hole to be wholly or predominantly located in the upper quadrants 88, 89. Locating a substantial part of the cut-out or hole in the upper quadrants may facilitate brake cooling by convection. Conveniently greater than 40% of the total area of cut-out(s) or hole(s) though the cover (as projected onto a plane perpendicular to the wheel axis) is located in the upper quadrants 88, 89.
- It may be advantageous for the cut-out or hole to be located so that it partly or wholly overlaps a brake caliper 92 of the wheel, when the two are projected onto a plane perpendicular to the wheel axis. This can help heat to escape the caliper by radiation. It has been found that preferred characteristics of the cut-out(s) or hole(s) through the cover, any of which may be adopted individually or in combination are:

1. for the hole or cut-out to be located at the periphery of the cover;
2. for 100% or more than 90% of the total area of the hole(s) as projected onto a plane perpendicular to the wheel axis to be located downstream of the wheel axis in the plane.
3. for 50% or more than 40% of the total area of the hole(s) as projected onto a plane perpendicular to the wheel axis to be located above the wheel axis in the plane;
4. for 50% or more of the projection of a brake caliper of the wheel onto a plane perpendicular to the wheel axis to be overlapped by the hole(s).

The area of a hole located at the edge of the cover may be determined by taking the circumferential continuation of the outer rim of the cover with constant radius from the points where the hole deviates from that rim to define the outer edge of the hole.

Figure 11:
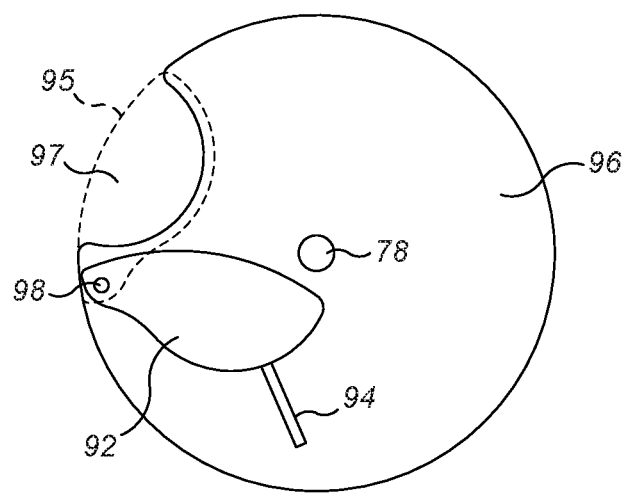
FIG. 11 is a schematic view of a wheel cover with movable shutter.

The cover may be configured so that it has one or more through-holes (which may or may not be at the periphery of the cover) and a mechanism whereby one or more of those holes can be selectively opened or closed. For example, there may be a shutter located immediately inboard of the cover which can be rotated (e.g. by means of a motor or a linear actuator) relative to the cover to close the hole(s). The mechanism may be actuated to open the hole(s) in response to a command from a driver of the vehicle or dependence on one or more predetermined conditions. For example, the shutter could be actuated to close the hole(s) when the vehicle exceeds a predetermined speed and to subsequently open the hole(s) when the vehicle brakes. Alternatively, the shutter could be actuated to open the hole(s) when the temperature of the wheel's brake exceeds a predetermined threshold. FIG. 11 shows such a wheel cover from the inboard side. The wheel cover 96 has a hole in the form of a peripheral cut-out 97. A shutter 98 is mounted to the cover 96 by a pin 93 about which it can rotate relative to the cover. A linear actuator 94 carried by the cover can be operated to cause the shutter to move between a first position (as shown in FIG. 11) in which the hole is unobscured and a second position (as shown by the dotted line at 95) in which it closes the hole.

A vehicle may be provided with a static wheel cover of the type described with reference to FIGS. 6 to 11 and a duct of the type described with reference to FIGS. 2 to 5. The duct may be configured to direct air from its outlet in the wheel arch on to the leading edge of the wheel cover. This is particularly effective in reducing drag because the static wheel cover can better encourage air flow to stay attached to the vehicle than a wheel with no cover or a wheel with a rotating cover. The duct may be configured to direct air at a tangent to the exterior surface of the wheel cover. The duct may be configured so that, in at least one condition of the vehicle, when the vehicle is in motion at a speed greater than 100 km/h or greater than 150 km/h or greater than 200 km/h in a straight line in still air at standard temperature and pressure the majority of the air flowing through the duct is directed (i) to the exterior surface of the wheel cover and/or (ii) to pass within 20 mm of the exterior surface of the wheel cover.

The mechanism by which the cover is restrained from rotation about the wheel axis could be configured in other ways. For example, the inner shaft 77 could be integral with the cover 63 and/or with the reaction link 67. In the description above the wheel cover has been described as applied to a front, steerable wheel. It could analogously be applied to a rear and/or non-steerable wheel. The reaction link 67 could be attached to the vehicle body rather than the wheel carrier 68. This may be advantageous in the case of a non-steerable wheel. In the description above the wheel is a non-driven wheel. If the wheel is driven by a drive shaft, the reaction link may extend through the centre of the drive shaft.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle wheel structure for a vehicle having a body comprising:
   a road wheel;
   a wheel mounting structure whereby the wheel is mounted to the body of the vehicle, the mounting structure comprising a wheel bearing by which the wheel can revolve about a wheel axis with respect to the body of the vehicle;
   a wheel cover attached to the wheel by a wheel cover bearing by which the wheel can revolve about the wheel axis with respect to the wheel cover; and
   a link coupled between (i) the cover and (ii) one of the mounting structure and the vehicle body for resisting rotation of the wheel cover with respect to the wheel mounting structure about the wheel axis, wherein the link is not free to rotate with respect to the mounting structure or the vehicle about the wheel axis.

2. The vehicle wheel structure as claimed in claim 1, wherein the wheel bearing is configured to transfer at least part of the weight of the vehicle body to the wheel.

3. The vehicle wheel structure as claimed in claim 1, wherein the vehicle wheel structure comprises a wheel cover mounting comprising:
   an outer shell attached to the wheel; and
   an inner element attached to the outer shell by the wheel cover bearing, the wheel cover being fixed to the inner element.

4. The vehicle wheel structure as claimed in claim 3, wherein the outer shell is attached to the wheel at the centre of the wheel.

5. The vehicle wheel structure as claimed in claim 2, wherein the link is configured to engage an inner element for resisting rotation of the inner element with respect to the wheel mounting structure about the wheel axis.

6. The vehicle wheel structure as claimed in claim 5, wherein the outboard end of the link is configured to engage the inboard end of the inner element in a manner that resists relative rotation of the link and the inner element about the wheel axis.

7. The vehicle wheel structure as claimed in claim 6, wherein the outboard end of the link is configured to engage the inboard end of the inner element in a manner that permits minimal relative rotation of the link and the inner element about a steering axis of the vehicle.

8. The vehicle wheel structure as claimed in claim 5, wherein the link is configured to engage the inner element through relative motion of the link and the inner element parallel to the wheel axis.

9. The vehicle wheel structure as claimed in claim 1, wherein the outboard surface of the wheel cover is substantially flat.

10. The vehicle wheel structure as claimed in claim 1, wherein the majority of the periphery of the wheel cover about the wheel axis lies on a circle about the wheel axis.

11. The vehicle wheel structure as claimed in claim 10, wherein the wheel comprises a wheel rim and the distance parallel to the wheel axis between the parts of the periphery of the wheel cover that lie on the said circle and the outboard surface of the rim of the wheel is between 2 mm and 10 mm.

12. The vehicle wheel structure as claimed in claim 10, wherein at least part of the periphery of the wheel cover about the wheel axis is inboard of the said circle, defining a hole between the said circle and the said part of the periphery.

13. The vehicle wheel structure as claimed in claim 10, wherein the wheel cover defines a hole therethrough, the hole being within the periphery of the wheel cover.

14. The vehicle wheel structure as claimed in claim 12, wherein the hole is located at least partially above the wheel axis.

15. The vehicle wheel structure as claimed in claim 13, wherein the hole is located at least partially between behind the wheel axis and a rear of the vehicle.

16. The vehicle wheel structure as claimed in claim 12, wherein the vehicle wheel structure comprises a brake caliper arranged for braking the wheel and the hole is located adjacent the brake caliper.

17. The vehicle wheel structure as claimed in claim 7, wherein the steering axis is within 20° of the vehicle's Z axis when the structure is attached to the vehicle.

* * * * *